United States Patent
Renforth et al.

(10) Patent No.: US 9,301,493 B2
(45) Date of Patent: Apr. 5, 2016

(54) PET CARRIER

(71) Applicant: DOSKOCIL MANUFACTURING COMPANY, INC., Arlington, TX (US)

(72) Inventors: Jack William Renforth, Azle, TX (US); Ann Hanson, Ionia, MI (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 82 days.

(21) Appl. No.: 14/183,782

(22) Filed: Feb. 19, 2014

(65) Prior Publication Data

US 2014/0230748 A1 Aug. 21, 2014

Related U.S. Application Data

(60) Provisional application No. 61/766,219, filed on Feb. 19, 2013.

(51) Int. Cl.
*A01K 1/03* (2006.01)
*A01K 1/02* (2006.01)

(52) U.S. Cl.
CPC .................. *A01K 1/0254* (2013.01)

(58) Field of Classification Search
USPC ......... 119/416, 431, 452, 453, 459, 461, 474, 119/478, 482, 491, 493, 496, 497, 498, 512, 119/513; 190/100, 102, 103, 110, 111, 109
See application file for complete search history.

(56) References Cited

U.S. PATENT DOCUMENTS

| | | | |
|---|---|---|---|
| 5,671,698 A * | 9/1997 | Farrugia ........................ | 119/497 |
| 5,931,120 A * | 8/1999 | Burns et al. ................... | 119/497 |
| 6,907,842 B2 | 6/2005 | Godshaw | |
| 7,210,426 B2 * | 5/2007 | Yeung .......................... | 119/497 |
| 7,789,044 B2 * | 9/2010 | McGrade ..................... | 119/496 |
| 7,802,540 B2 * | 9/2010 | Jakubowski et al. ......... | 119/499 |
| 7,896,143 B2 * | 3/2011 | Lee .............................. | 190/107 |
| 8,261,698 B1 * | 9/2012 | McClain ...................... | 119/501 |
| 8,459,208 B2 | 6/2013 | Chou | |
| 2001/0004882 A1 | 6/2001 | Burns et al. | |
| 2007/0056524 A1 | 3/2007 | Barca | |
| 2010/0288204 A1 | 11/2010 | Costello et al. | |
| 2012/0186533 A1 | 7/2012 | Lu | |

\* cited by examiner

*Primary Examiner* — Richard Price, Jr.
(74) *Attorney, Agent, or Firm* — Global IP Counselors, LLP

(57) ABSTRACT

A pet carrier includes a bottom panel having a pair of end edges and a pair of side edges that are longer than the end edges, a pair of side panels attached to the side edges of the bottom panel, a pair of end panels attached to the end edges of the bottom panel, and a top panel. The bottom panel, the side panels, the end panels, and the top panel enclose an interior area for carrying a pet when the pet carrier is in a closed configuration. One of the side panels is an openable side panel structured to fold downward and form a flush surface with the bottom panel when the pet carrier is in an open configuration.

11 Claims, 6 Drawing Sheets

PET CARRIER

CROSS-REFERENCE TO RELATED APPLICATION

This application claims priority from and claims the benefit of U.S. Provisional Patent Application Ser. No. 61/766,219, filed Feb. 19, 2013, the entire disclosure of which is incorporated by reference herein.

BACKGROUND

1. Field

The disclosed concept relates generally to pet carriers and, more particularly, to a pet carrier which functions as both a pet carrier and a pet bed.

2. Related Art

Pet carriers are generally well known in the relevant art. Known pet carriers generally serve a pet owner's purpose of carrying their pet to a destination. However, once the pet owner reaches the destination, the known pet carriers are not useful until the pet needs to be transported again.

It would thus be desirable to provide an improved pet carrier that overcomes these and other shortcomings in the relevant art.

SUMMARY

In accordance with an aspect of the disclosed concept, a pet carrier includes a bottom panel having a pair of end edges and a pair of side edges that are longer than the end edges, a pair of side panels attached to the side edges of the bottom panel, a pair of end panels attached to the end edges of the bottom panel, and a top panel, wherein the bottom panel, the side panels, the end panels, and the top panel enclose an interior area for carrying a pet when the pet carrier is in a closed configuration, and wherein one of the side panels is an openable side panel structured to fold downward and form a flush surface with the bottom panel when the pet carrier is in an open configuration.

BRIEF DESCRIPTION OF THE DRAWINGS

A further understanding of the disclosed and claimed concept can be gained from the following Detailed Description when read in conjunction with the accompanying drawing in which:

Similar numerals refer to similar parts throughout the specification.

DETAILED DESCRIPTION

Figure 1:
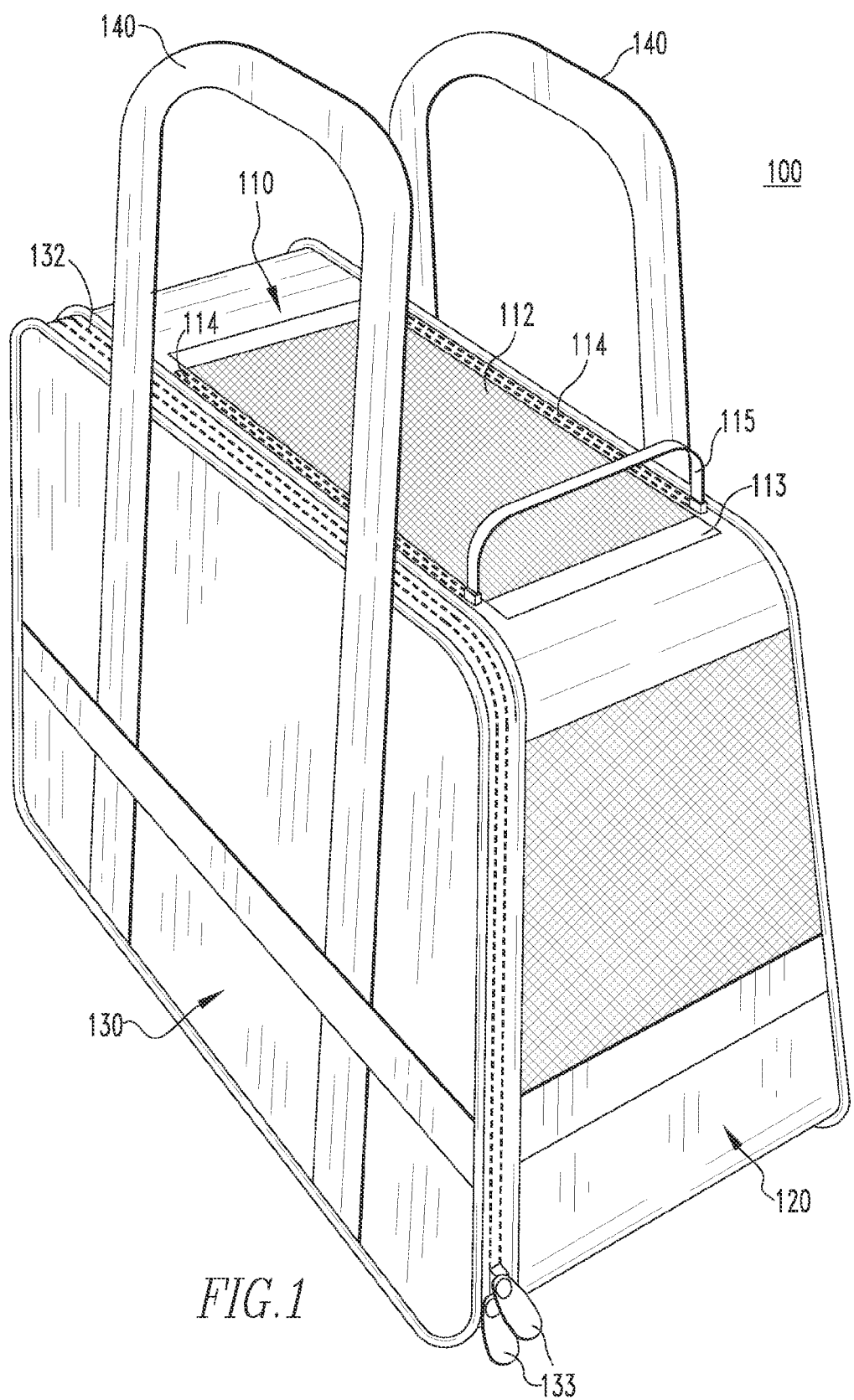
FIG. 1 is a view of a pet carrier in a closed configuration in accordance with an embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

Referring to FIG. 1, an isometric view of a pet carrier 100 in accordance with an embodiment of the disclosed concept is shown. The pet carrier 100 is depicted in a closed configuration in FIG. 1. The pet carrier 100 includes a top panel 110, a bottom panel 111 (see FIG. 2), end panels 120,121 (see FIG. 3), an openable side panel 130, and a closed side panel 131 (see FIG. 3). The side panels 130,131 are attached to the longer side edges of the bottom panel 111 and the end panels 120,121 are attached to the shorter end edges of the bottom panel 111. Together, top panel 110, bottom panel 111, end panels 120,121, openable side panel 130, and closed side panel 131 form an enclosed interior area in which a pet can be carried while the pet carrier 100 is in the closed configuration depicted in FIG. 1. The pet carrier 100 also includes straps 140 which can be used to assist with carrying the pet carrier 100.

The top panel 110 of the pet carrier 100 further includes an openable flap 112 which can be opened to allow a pet to be inserted or removed from the pet carrier 100 through the top panel 110. The openable flap 112 can also be opened to allow the pet to, for example, stick its head outside of the pet carrier 100 during transport. At least a portion of the openable flap 112 can be composed of a mesh window, but the disclosed concept is not limited thereto. The mesh material allows the pet to look through the openable flap 112. When closed, the openable flap 112 is secured by a Velcro fastener 113 and a double zipper 114 (shown schematically).

The end panels 120,121 can also include one or more mesh windows 122 (see FIG. 3) which allow the pet to look through them. It will be appreciated by one of ordinary skill in the art that the location and size of the mesh windows 122 can be varied without departing from the scope of the disclosed concept. It will also be appreciated that the mesh windows 122 can be omitted without departing from the scope of the disclosed concept.

The openable side panel 130 forms one side of the pet carrier 100 and is releaseably attached to the top panel 110 and the end panels 120,121. When the pet carrier is in the closed configuration, a zipper 132 (shown schematically) disposed around three sides of the periphery of the openable side panel 130 attaches the openable side panel 130 to the top panel 110 and the end panels 120,121. The zipper 132 is operated via zipper pulls 133. Opening the zipper 132 releases the openable side panel 130 from the top panel 110 and end panels 120,121 allowing it to fold down to convert the pet carrier 100 to the open configuration shown in FIG. 3.

Figure 2:
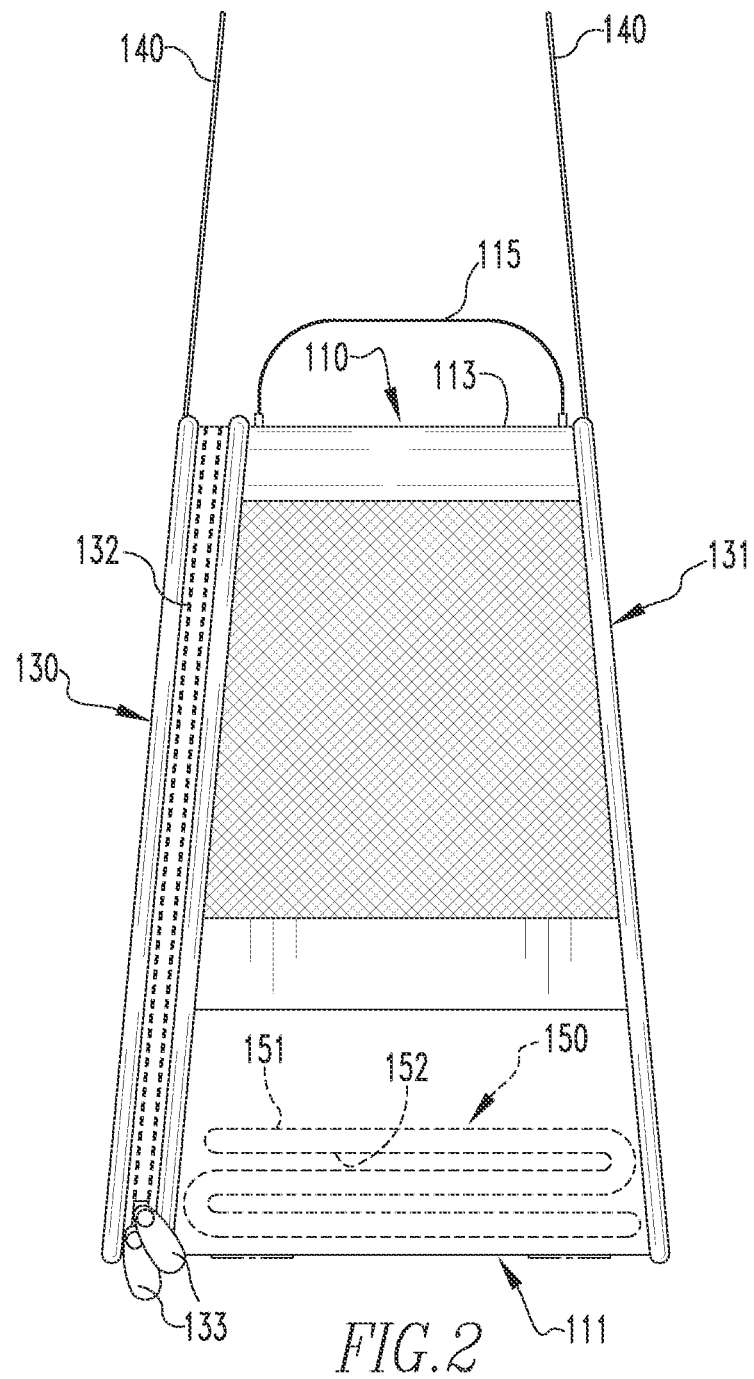
FIG. 2 is a side view of the embodiment of the pet carrier shown in FIG. 1.

Referring to FIG. 2, a side view of the pet carrier 100 in the closed configuration is Shown. The interior of the pet carrier 100 includes a foldable cushion 150. The cushion 150 includes a cushioned surface 151 and a non-cushioned surface 152. However, it will be appreciated by those skill in the art that both of the surfaces of the cushion 150 may be cushioned without departing from the scope of the disclosed concept. When the pet carrier 100 is in the closed configuration, the cushion 150 is folded to fit into the interior of the pet carrier 100 and rest on the bottom panel 111. When folded, the cushion 150 provides additional cushioning for the pet. When the pet carrier 100 is in the open configuration, the cushion 150 lays on the flush surface created by the openable side panel 130 and the bottom panel 111 (see FIG. 3). In the disclosed embodiment, the pet carrier 100 is structured such that the cushion 150 is folded at two points which makes the cushion 150 three layers thick inside the pet carrier 100 and provides additional padding for the pet. Additionally, the cushion 150 is structured such that the cushioned surface 151 is facing upward for the pet to rest on whether the pet carrier 100 is in the open configuration or the closed configuration. However, it will be appreciated by those skilled in the art, that the pet carrier 100 may be structured to have the cushion 150 fold in any suitable manner.

Figure 3:
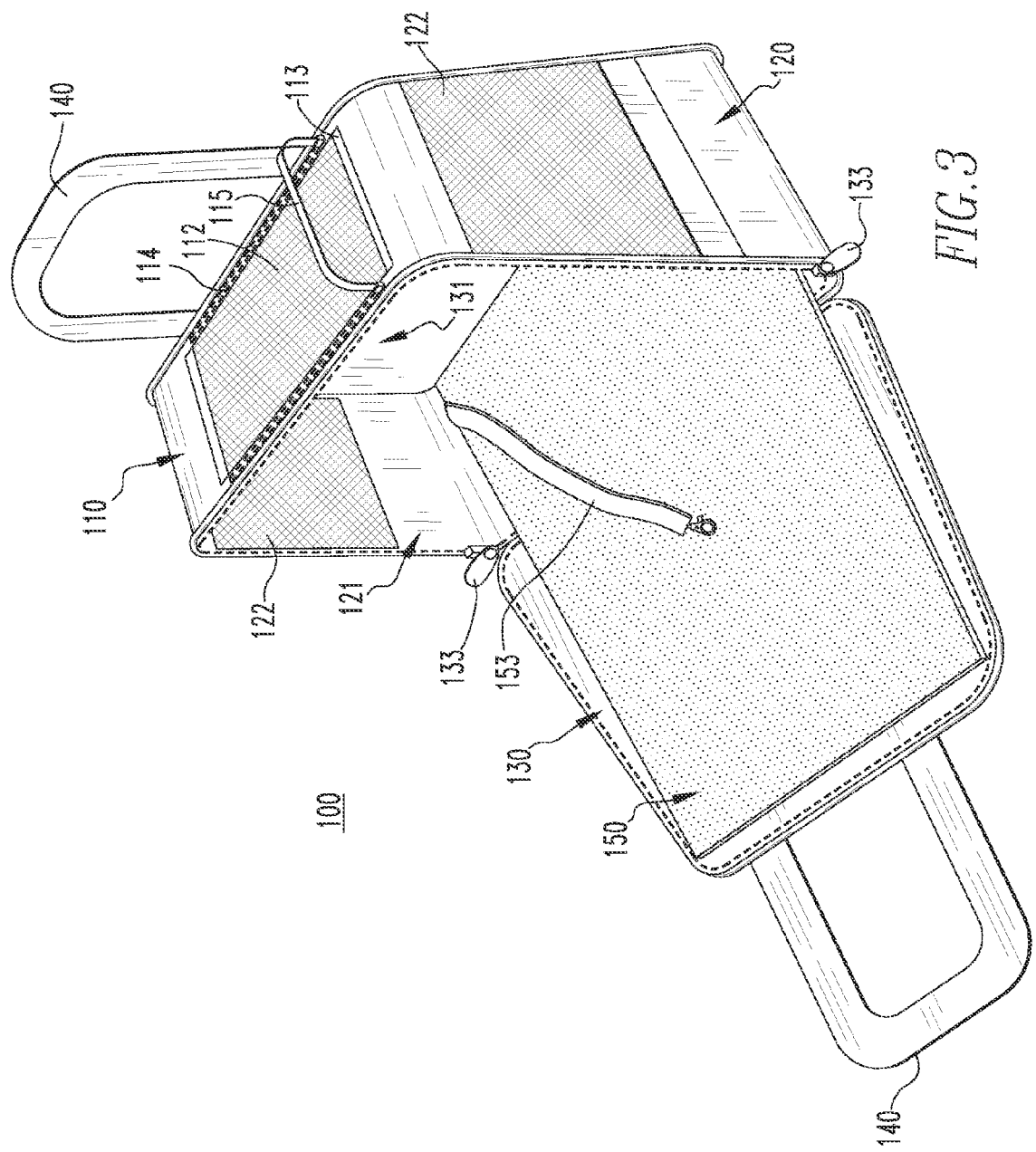
FIG. 3 is a view of the embodiment of the pet carrier shown in FIG. 1 in an open configuration.

FIG. 3 illustrates the pet carrier 100 in the open configuration. In the open configuration, the openable side panel 130 and the bottom panel 111 are substantially flush with each other so as to create a single flush surface. The cushion 150 folds out, as shown in FIG. 3, to create a sleeping surface for the pet. Thus, the pet carrier 100 not only serves as a carrier for the pet, but also functions as a bed for the pet.

The pet carrier 100 also includes a leash 153 which is attached to the interior of the pet carrier 100. The leash 153 can employed while the pet carrier 100 is in the closed configuration, for example, to prevent the pet from jumping out through the top portion 110 of the pet carrier 100. The leash 153 can also be employed while the pet carrier 100 is in the open configuration to keep the pet in the vicinity of the pet carrier 100. It will be appreciated by those skilled in the art that the leash 153 may be omitted without departing from the scope of the disclosed concept.

Figure 4:
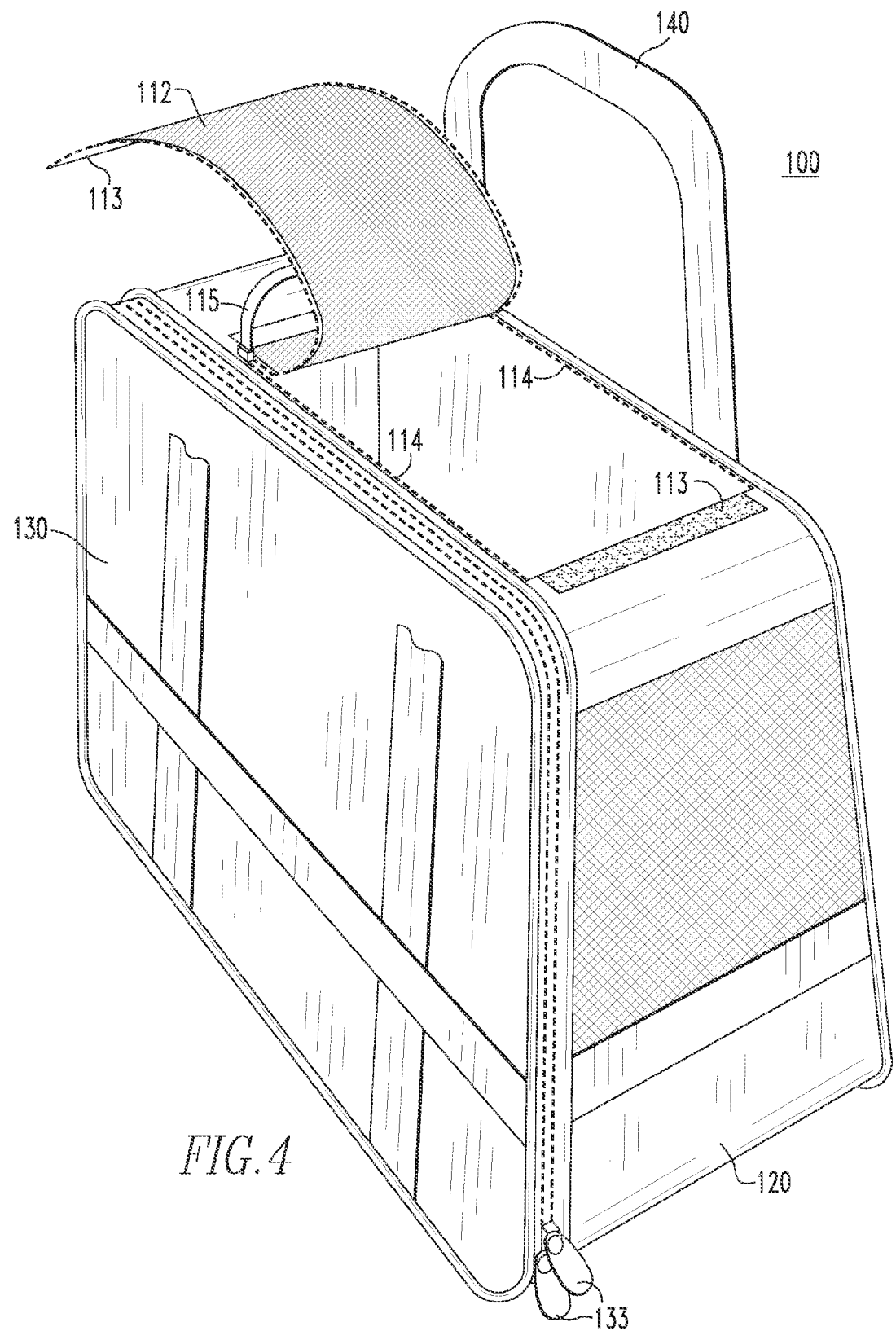
FIG. 4 is a view of the embodiment of the pet carrier shown in FIG. 1 with an openable flap in a top panel open.
Figure 5:
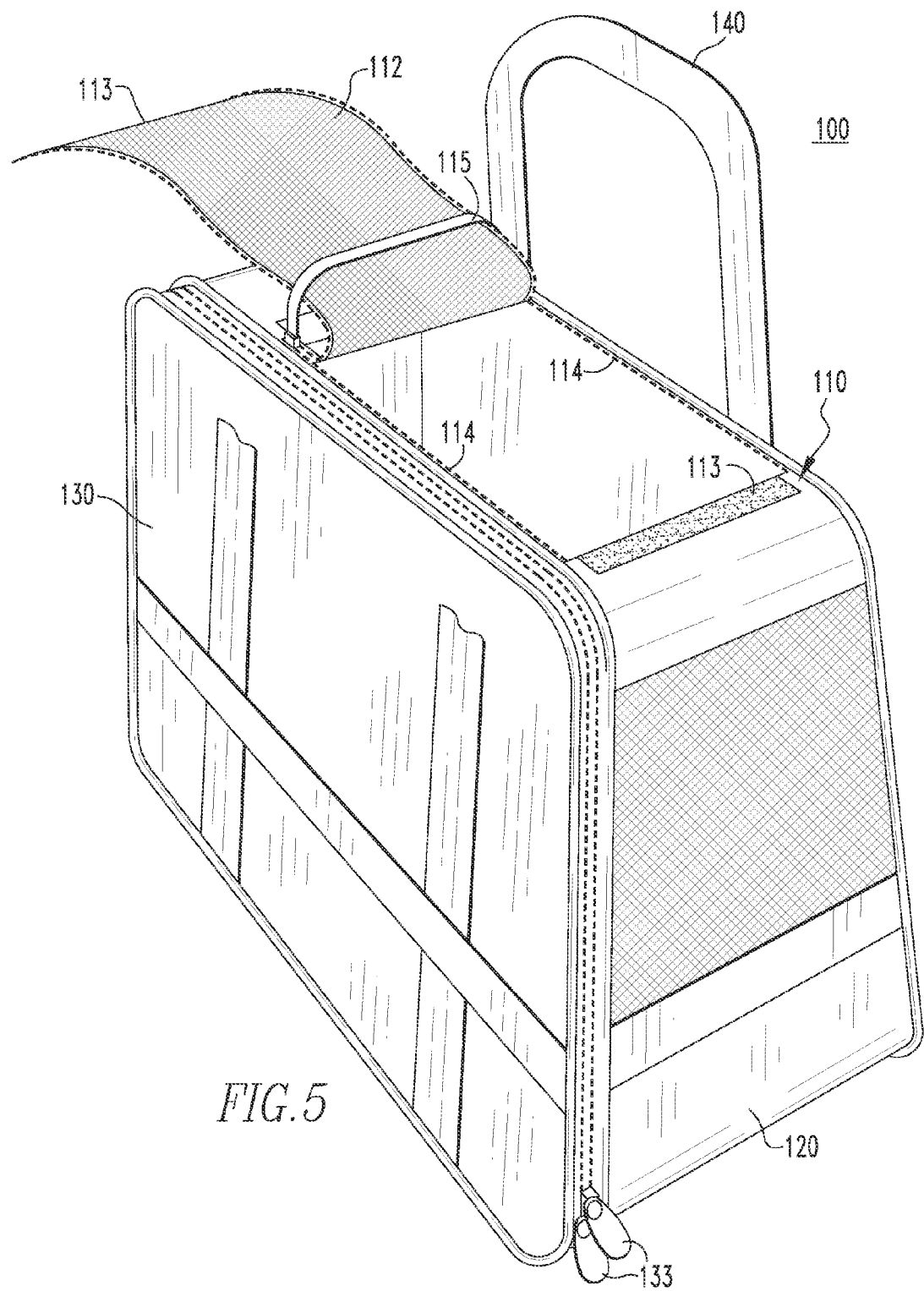
FIG. 5 is another view of the embodiment of the pet carrier shown in FIG. 1 with the openable flap in the top portion open.

Referring to FIGS. 4 and 5, a more detailed operation of opening the openable flap 112 is shown. As shown in FIG. 4, the top panel 110 includes a double zipper pull 115 which is employed to operate the double zipper 114. The double zipper pull 115 allows the openable flap 112 to be easily opened and closed. The double zipper pull 115 also functions to retain the openable flap 112 when it is opened, as depicted in FIG. 5.

Figure 6:
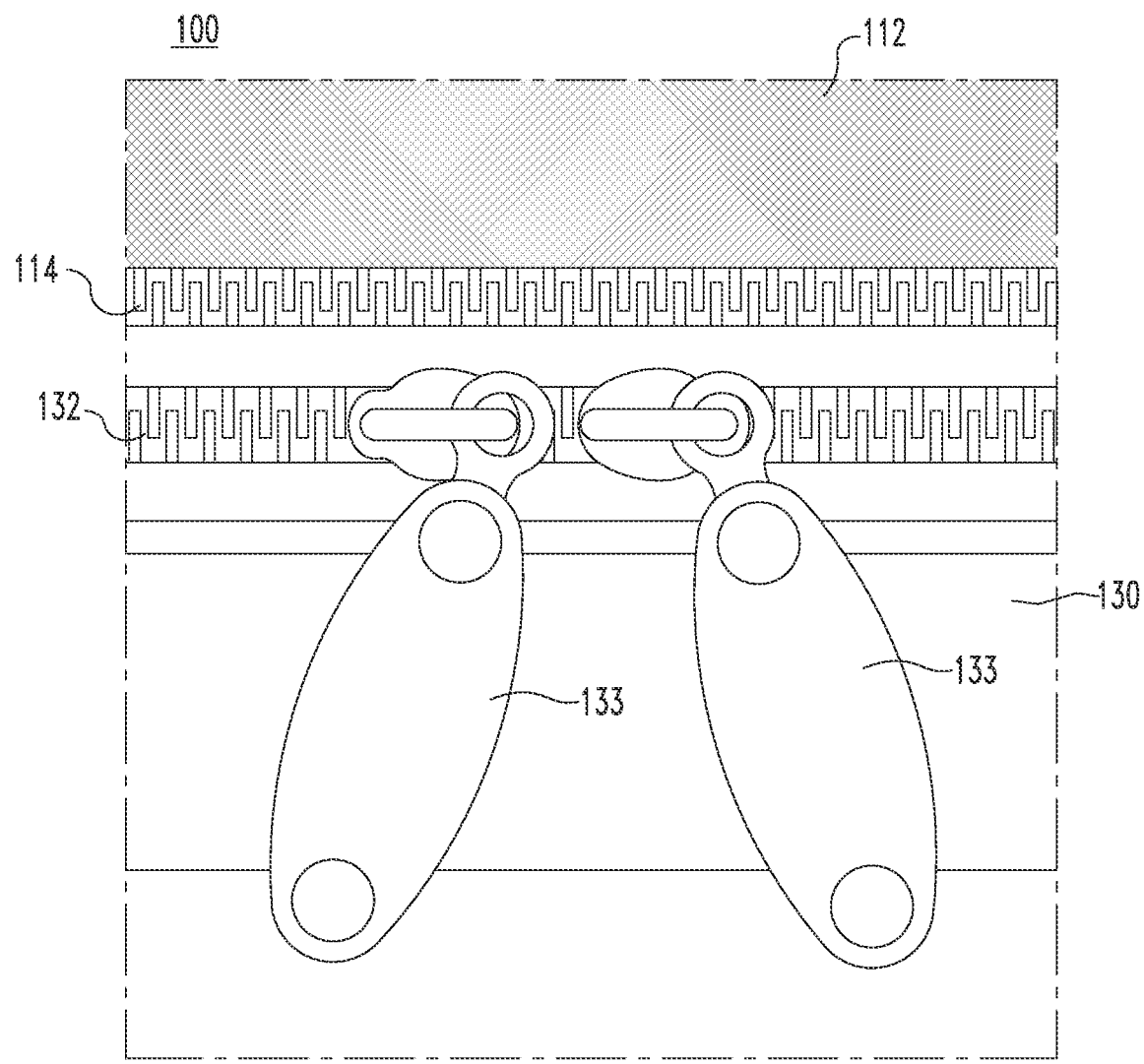
FIG. 6 is a view showing zipper pulls of the embodiment of the pet carrier shown in FIG. 1.

FIG. 6 illustrates zipper pulls 133. Zipper pulls 133 are enlarged for ease of use. Zipper pulls 133 are also suitable for including a label thereon, such as, for example, a company name or a company logo. It will be appreciated by those skilled in the art that any suitable zipper pull may be employed as zipper pulls 133 without departing from the scope of the disclosed concept.

The pet carrier 100 shown and described herein is functional as a pet carrier 100 while in the closed configuration and as a pet bed while in the open configuration. Thus, the pet carrier 100 remains useful after a pet owner reaches their destination.

Although the foregoing discussion has presented specific embodiments, persons skilled in the art will recognize that changes may be made in form and detail without departing from the spirit and scope of the embodiments to achieve similar functionality and utility to the exemplary embodiments disclosed herein. Moreover, it should be appreciated that features from a particular embodiment may be implemented in another embodiment disclosed herein to achieve a desired functionality. Accordingly, the specific embodiments described herein should be understood as examples and not limiting the scope of the disclosure.

What is claimed is:

1. A pet carrier comprising:
    a bottom panel having a pair of end edges and a pair of side edges that are longer than the end edges;
    a pair of side panels attached to the side edges of the bottom panel;
    a pair of end panels attached to the end edges of the bottom panel; and
    a top panel,
    the bottom panel, the side panels, the end panels, and the top panel enclosing an interior area for carrying a pet when the pet carrier is in a closed configuration, one of the side panels being an openable side panel structured to fold downward and form a single flush surface with the bottom panel when the pet carrier is in an open configuration.

2. A pet carrier comprising:
    a bottom panel having a pair of end edges and a pair of side edges that are longer than the end edges;
    a pair of side panels attached to the side edges of the bottom panel;
    a pair of end panels attached to the end edges of the bottom panel;
    a top panel,
    the bottom panel, the side panels, the end panels, and the top panel enclosing an interior area for carrying a pet when the pet carrier is in an closed configuration, one of the side panels being an openable side panel structured to fold downward and form a flush surface with the bottom panel when the pet carrier is in an open configuration; and
    a foldable cushion structured to rest on the bottom panel in an interior area in a folded configuration when the pet carrier is in the closed configuration and to rest on flush surface in an unfolded configuration when the pet carrier is in the open configuration.

3. The pet carrier of claim 2, wherein
    the cushion is folded at two points when in the folded configuration.

4. The pet carrier of claim 1, further comprising
    at least one mesh window disposed in at least one of the side panels, the end panels, and the top panel.

5. The pet carrier of claim 4, wherein
    the at least one mesh window includes a first mesh window disposed in the top panel and second and third mesh window respectively disposed in the end panels.

6. The pet carrier of claim 1, wherein
    the top panel includes an openable flap configured to open to provide access to the interior area when the pet carrier is in the closed configuration.

7. The pet carrier of claim 6, further comprising
    a double zipper comprising a pair of zippers each disposed at opposite edges of the openable flap and being structured to operate to secure the openable flap in the closed configuration and enabling the openable flap to open.

8. The pet carrier of claim 7, further comprising
    a double zipper pull member attached to both zippers of the double zipper and being structured such that pulling the double zipper pull member operates both zippers simultaneously.

9. The pet carrier of claim 1, further comprising
    a leash attached to one of the bottom panel, the side panels, the end panels and the top panel in the interior area of the pet carrier.

10. A pet carrier comprising:
    a bottom panel having a pair of end edges and a pair of side edges that are longer than the end edges;
    a pair of side panels attached to the side edges of the bottom panel;
    a pair of end panels attached to the end edges of the bottom panel;
    a top panel; and
    a fastener structured to releasably attach the openable side panel to the top panel and the end panels,
    the bottom panel, the side panels, the end panels, and the top panel enclosing an interior area for carrying a pet when the pet carrier is in a closed configuration, one of the side panels being an openable side panel structured to fold downward and form a flush surface with the bottom panel when the pet carrier is in an open configuration.

11. The pet carrier of claim 10, wherein
the fastener is a zipper disposed along edges of the openable side panel and adjacent edges of the top panel and end panels.

* * * * *